US007767945B2

(12) United States Patent
Williams

(10) Patent No.: US 7,767,945 B2
(45) Date of Patent: Aug. 3, 2010

(54) ABSOLUTE TIME ENCODED SEMI-ACTIVE LASER DESIGNATION

(75) Inventor: Darin S. Williams, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 68 days.

(21) Appl. No.: 12/327,624

(22) Filed: Dec. 3, 2008

(65) Prior Publication Data

US 2009/0078817 A1    Mar. 26, 2009

Related U.S. Application Data

(63) Continuation-in-part of application No. 11/286,760, filed on Nov. 23, 2005, now Pat. No. 7,494,089.

(51) Int. Cl.
*F41G 7/00* (2006.01)
*F41G 9/00* (2006.01)
*F42B 15/01* (2006.01)
*F42B 15/00* (2006.01)

(52) U.S. Cl. ............... 244/3.16; 244/3.1; 244/3.11; 244/3.15; 89/1.11; 342/357.01; 342/357.06; 342/357.1

(58) Field of Classification Search ........... 244/3.1–3.3, 244/158.1; 89/1.11; 701/200, 207, 213–216, 701/220–226, 300–302; 342/52–55, 61–68, 342/175, 195, 189, 357.01–357.17; 102/473, 102/475, 476, 489, 200, 206, 211–214, 293; 348/169; 356/138, 152.1–152.3; 250/200, 250/201.1, 203.1, 203.3, 203.6, 206, 206.1–206.3
See application file for complete search history.

(56) References Cited

U.S. PATENT DOCUMENTS

| | | | |
|---|---|---|---|
| 3,366,346 A | 1/1968 | McKnight et al. | |
| 4,047,117 A * | 9/1977 | Tuchyner et al. | ........... 244/3.16 |
| 4,143,835 A * | 3/1979 | Jennings et al. | ........... 244/3.11 |
| 4,269,121 A * | 5/1981 | Sochard | ...................... 102/213 |
| 4,338,602 A * | 7/1982 | Roeder et al. | ................. 342/62 |
| 4,407,465 A | 10/1983 | Meyerhoff | |
| 4,558,836 A | 12/1985 | Kriegesmann | |
| 4,796,834 A * | 1/1989 | Ahlstrom | ................... 244/3.16 |
| 5,023,888 A * | 6/1991 | Bayston | ...................... 342/189 |
| 5,026,156 A * | 6/1991 | Bayston et al. | ............. 342/189 |
| 5,111,689 A * | 5/1992 | Towry | ........................ 102/293 |
| 5,664,741 A * | 9/1997 | Duke | ......................... 244/3.11 |
| 6,987,256 B2 * | 1/2006 | English et al. | ........... 250/203.6 |

(Continued)

*Primary Examiner*—Bernarr E Gregory
(74) *Attorney, Agent, or Firm*—Eric A. Gifford

(57) ABSTRACT

SAL designation uses absolute time coding of the pulse-stream to disambiguate the designator in a manner that reduces the number of pulses in a pulse-stream and reduces the total pulse energy on the target. This requires timing synchronization between the designator and receiver. For improved rejection of unintended returns, more precise time gating (narrower absolute time window) is required. This can be achieved by removing the path length and or firing time uncertainty errors. Absolute time coding reduces the number of pulses and total energy on target in two ways. First, the designator may only have to transmit the pulse-code once. The "spot" appears for the brief time associated with a pulse-stream and disappears; continuous lasing of the target is not required. Second, the designator can be disambiguated using a combination of pulse-code (relative spacing of pulses) and pulse-position (absolute timing of pulses) modulation. This allows the pulse-stream to be shortened considerably, perhaps to a single pulse.

33 Claims, 7 Drawing Sheets

U.S. PATENT DOCUMENTS 7,053,993 B2    5/2006  de Virel
7,059,560 B2 *  6/2006  Ljungberg et al. ......... 244/3.13

2003/0014205 A1   1/2003  Tabor

* cited by examiner

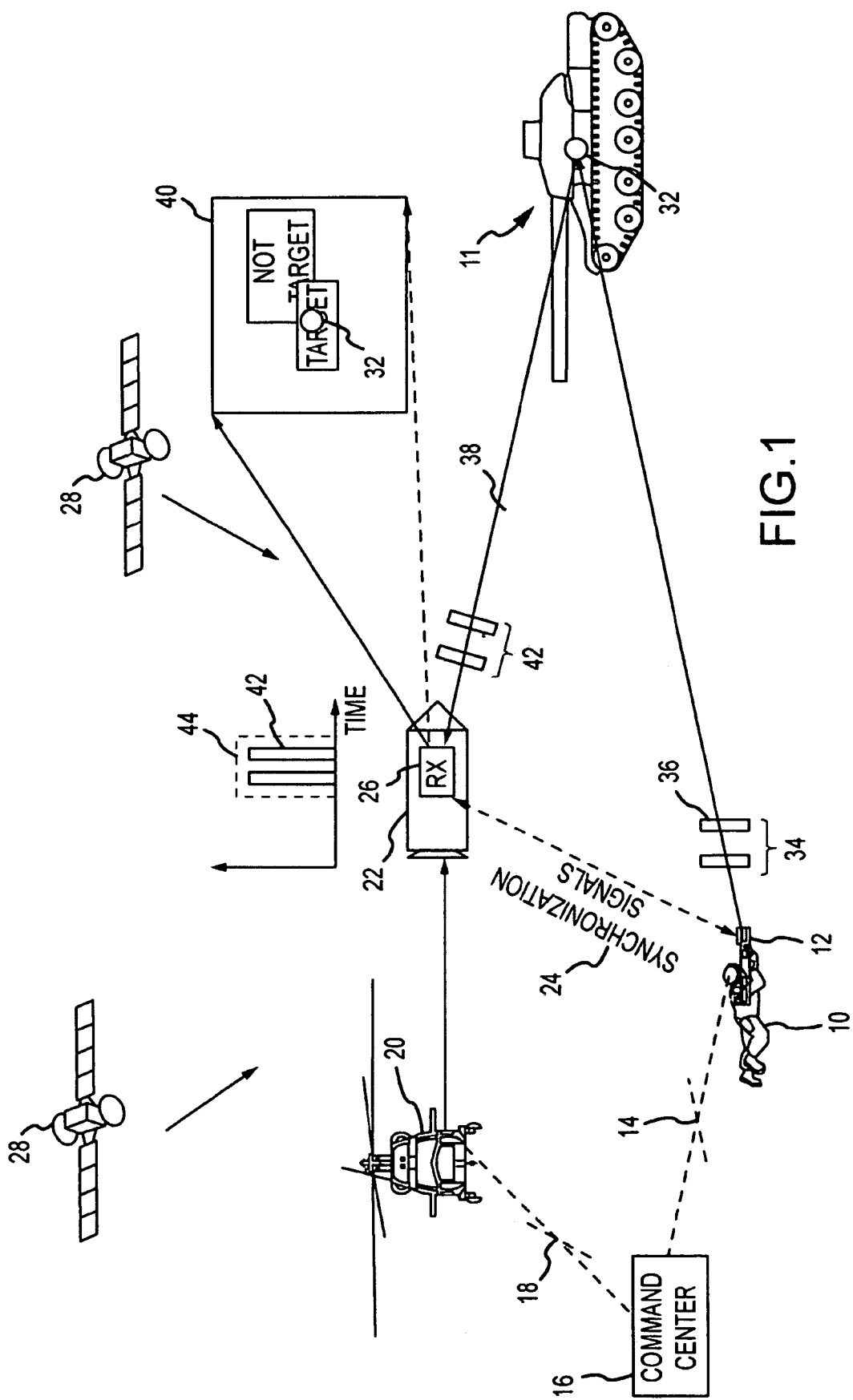

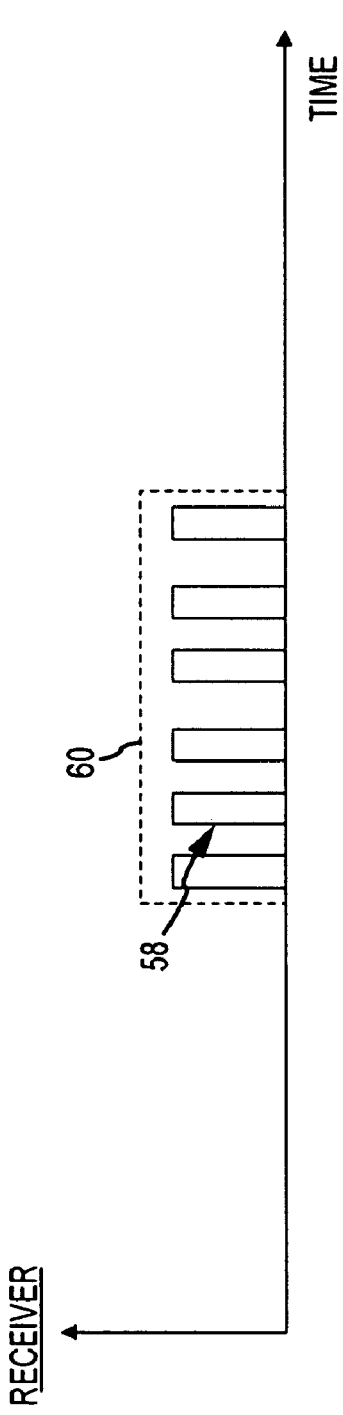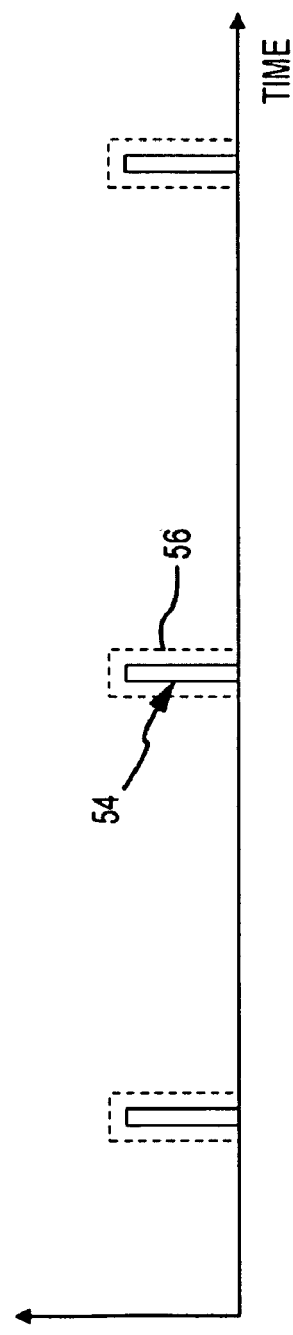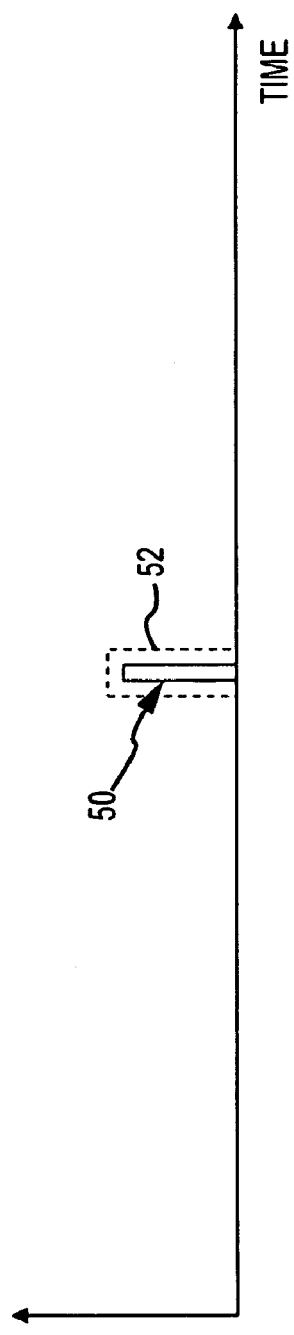

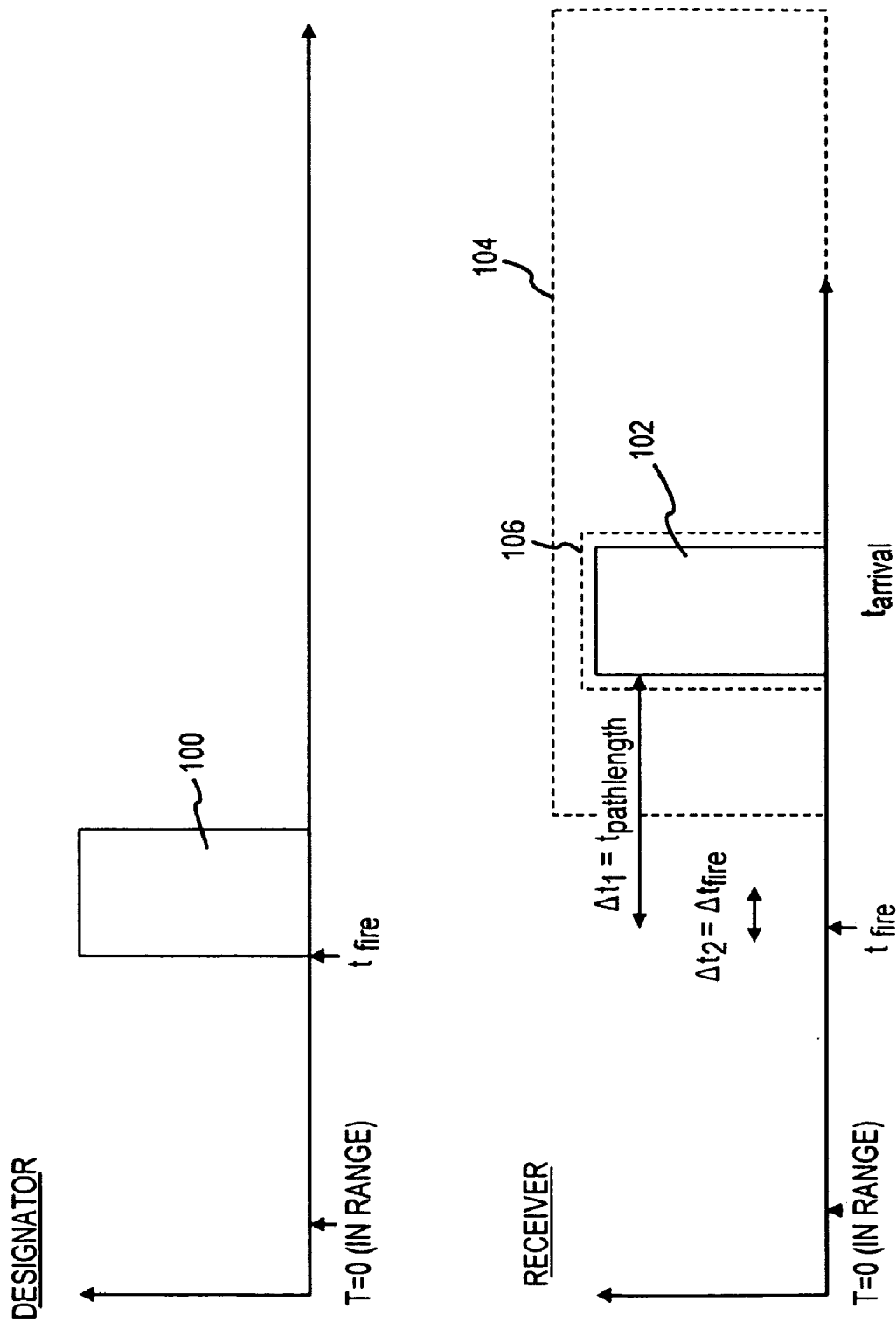

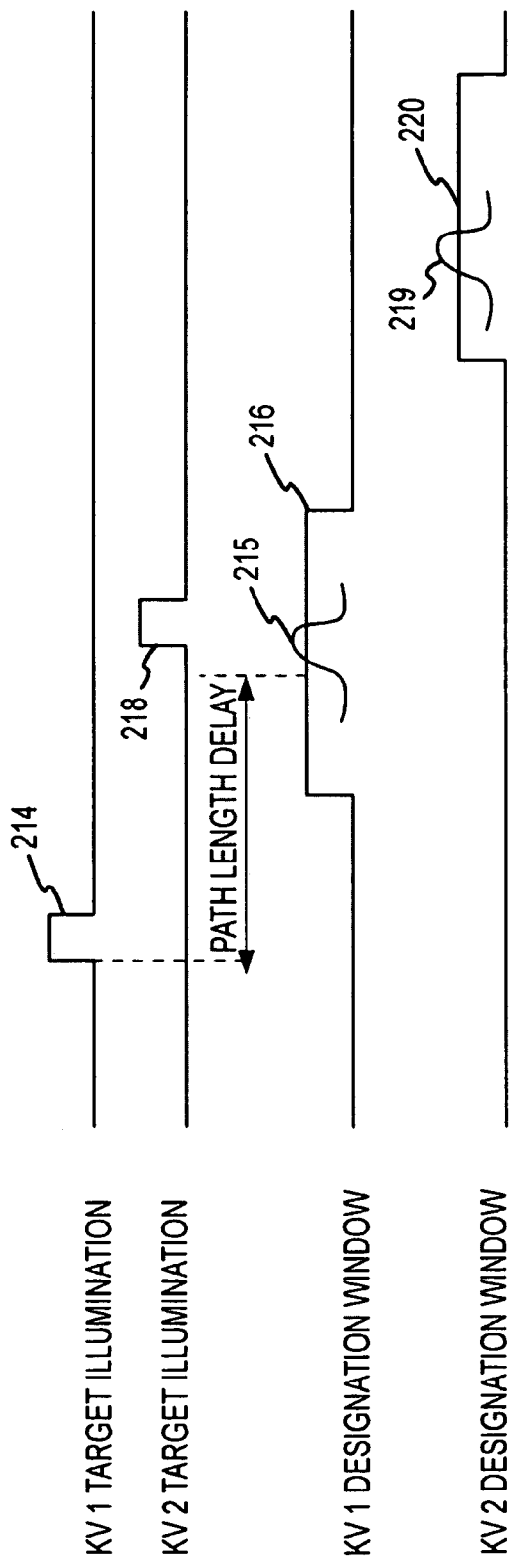
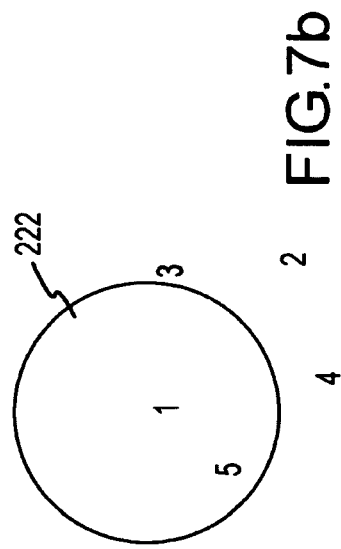

ABSOLUTE TIME ENCODED SEMI-ACTIVE LASER DESIGNATION

CROSS-REFERENCE TO RELATED APPLICATIONS

This application claims benefit of priority under 35 U.S.C. 120 as a continuation-in-part of U.S. Utility Application Ser. No. 11/286,760 entitled "MULTIPLE KILL VEHICLE (MKV) INTERCEPTOR AND METHOD FOR INTERCEPTING EXO AND ENDO-ATMOSPHERIC TARGETS" and filed on Nov. 23, 2005, the entire contents of which are incorporated by reference, now U.S. Pat. No. 7,494,089.

BACKGROUND OF THE INVENTION

1. Field of the Invention

This invention relates to semi-active laser (SAL) designation of targets.

2. Description of the Related Art

The military uses SAL designation to designate targets and guide the missile (weapon) to the target. In SAL designation the designator and the receiver are located on separate platforms. In many battlefield scenarios, SAL designation that maintains "man-in-the-loop" capability is preferred to active designation systems that require the weapon to designate the target. The SAL designator may be man-portable or carried by a designator aircraft such as an unmanned aerial vehicle (UAV).

The operator coordinates via radio with a command center and fires the SAL designator to transmit a narrow pulsed laser beam to place and hold a spot on the target. As soon as the weapon is in range, the SAL receiver starts processing the detected returns to detect the spot, acquire the designated target and to verify that the SAL designator was the source. On a battlefield there can be many 'false' returns either randomly generated or generated by enemy countermeasures attempting to jam the SAL receiver. To reduce the ambiguity of designator verification to an acceptable level, the pulses are transmitted at a precise frequency known to the receiver. The receiver performs a time correlation of the known pulse tuned to the known frequency against the detected returns until the target is designated and the designator verified as the source. The SAL receiver also includes processing equipment for generating guidance commands from the pulse-stream to guide the weapon to impact. To support the bandwidth or update requirements of the guidance system, the target must be lased until impact and the frequency of pulses must be high.

The effectiveness of these systems is limited by the need to hold the laser spot on target from initiation through acquisition until impact, and by the potential for systems that can detect the incoming laser and deploy counter measures. The exposure of laser operators or laser platforms increases the length of time that they remain exposed. Also, the power requirements for lasers to generate high-power high-frequency pulses for extended periods to hold a spot on the target can be inhibiting.

SUMMARY OF THE INVENTION

The present invention provides SAL designation that uses absolute time coding of the pulse-stream to disambiguate the designator in a manner that reduces the number of pulses in a pulse-stream and reduces the total pulse energy on the target.

In an embodiment, SAL designation communicates an absolute timing signal between a receiver on a first platform and a designator on a second remote platform indicating the expected arrival time of a reflected pulse-stream at the receiver. A pulse-stream including at least one pulse is transmitted from the designator towards a target. The returns from the target at the receiver are gated within an absolute time window. The absolute timing signal is used to synchronize the timing between the transmission of the laser pulse-stream and the gating of the returns to place the reflected pulse-stream in the absolute time window at the receiver. The returns in the absolute time window are processed to extract the pulse-stream to designate the target and verify the designator as the source of the pulse-stream.

The communication of the absolute timing signal in whole or in part can be performed in many different ways. In an embodiment, the receiver sends the absolute timing signal to the designator indicating when to transmit the pulse-stream or when the absolute time window is open at the receiver. In another embodiment the designator sends the absolute timing signal to the receiver indicating when the designator will transmit or has transmitted the pulse-stream, when the pulse-stream will reach the target or when the reflected pulse-stream will arrive at the receiver. In another embodiment, a $3^{rd}$ party sends the absolute timing signal to the designator and the receiver.

Absolute time coding reduces the number of pulses and total energy on target in two ways. First, the designator may only have to transmit the pulse-code once. The "spot" appears for the brief time associated with a pulse-stream and disappears; continuous lasing of the target is not required. The system may be configured for the receiver to send a verification signal of successful designation, to send another absolute timing signal if designation is not received in the open gate, to transmit another pulse-stream with a timing signal if verification not received etc. Second, the designator can be disambiguated using a combination of pulse-code modulation (spacing of pulses) and pulse-position modulation (absolute timing of pulses). This allows the pulse-stream to be shortened considerably, perhaps to a single pulse.

The pulse-stream may include a single pulse, a sequence of single pulses (each separately gated at the receiver) or multiple pulses (single gate) or combinations thereof (e.g. sequence of few pulses per gate). The sequence of single pulses may be treated as one pulse-stream with the spacing between the pulses known to both the designator and receiver a priori or as unique pulse-streams at arbitrary times each accompanied by an absolute timing signal. The number and relative spacing of pulses in the pulse stream and placement of the entire pulse-stream in a time window or individual pulses in separate time windows reduces the ambiguity of designator verification to less than a specified threshold. A single pulse places the tightest tolerance on the time window to disambiguate the designator.

Synchronization of the designator and receiver to place the reflected pulse-stream in the absolute time window has two parts. The first part is the absolute time signal that indicates the arrival time of the reflected pulse. The second part is the timing errors that are accounted for in the width of the absolute time window. At a minimum the window must account for the width of the pulse-stream any clock synchronization errors between the designator and receiver. For example, the designator and receiver may synchronize their clocks to a GPS or other satellite system, which will have some amount of error. Other timing uncertainties include the path length delay for the pulse-stream from the designator to the target and back to the receiver. Without correction, the window must accommodate the minimum and maximum path length delay.

Without correction, the timing uncertainty between the intended and actual firing of the pulse-stream should also be accommodated.

To reduce designator ambiguity, either or both of the path length delay and the firing uncertainty can be corrected. Correction has the effect of both narrowing the absolute time window and shifting the placement of the window. For path length correction, the system may assume that the error will be removed and set the absolute time window accordingly a priori. Alternately, the system may set a default time window large enough to account for path length uncertainty should the correction be unavailable. For firing time correction, the system will store the returns within the absolute time window, possibly already narrowed for path length correction, and upon receipt of the firing time correction narrow and shift the windowing of the stored data that is then processed.

In another embodiment, a target acquisition system identifies a plurality of targets and a beam pointing system (BPS) slews the designator and transmits a pulse-stream towards each of the targets in a time sequence. A controller suitably controls the BPS to lase the targets in sequence so that any target within the angle uncertainty of the laser is not within the timing uncertainty. The reflected pulse-streams are received at a respective plurality of the receivers on different platforms. The timing between the designator's transmission of each pulse-stream and each receiver's gating of the returns off the different targets is synchronized to place each reflected pulse-stream in an absolute time window at the respective receiver.

These and other features and advantages of the invention will be apparent to those skilled in the art from the following detailed description of preferred embodiments, taken together with the accompanying drawings, in which:

BRIEF DESCRIPTION OF THE DRAWINGS

FIG. 1 is a diagram of precision-guided weapon using absolute time encoded semi-active laser (SAL) designation in accordance with the present invention;

FIGS. 2a through 2c illustrate the reception of absolute time encoded pulse streams including a single pulse, multiple individual pulses and multiple pulses, respectively;

FIG. 3 is a diagram illustrating the path length and firing time corrections to narrow the absolute time window and shift the absolute timing signal;

FIGS. 7a and 7b are diagrams for implementing a QWERTY scan to designate the multiple targets.

DETAILED DESCRIPTION OF THE INVENTION

Figure 4:
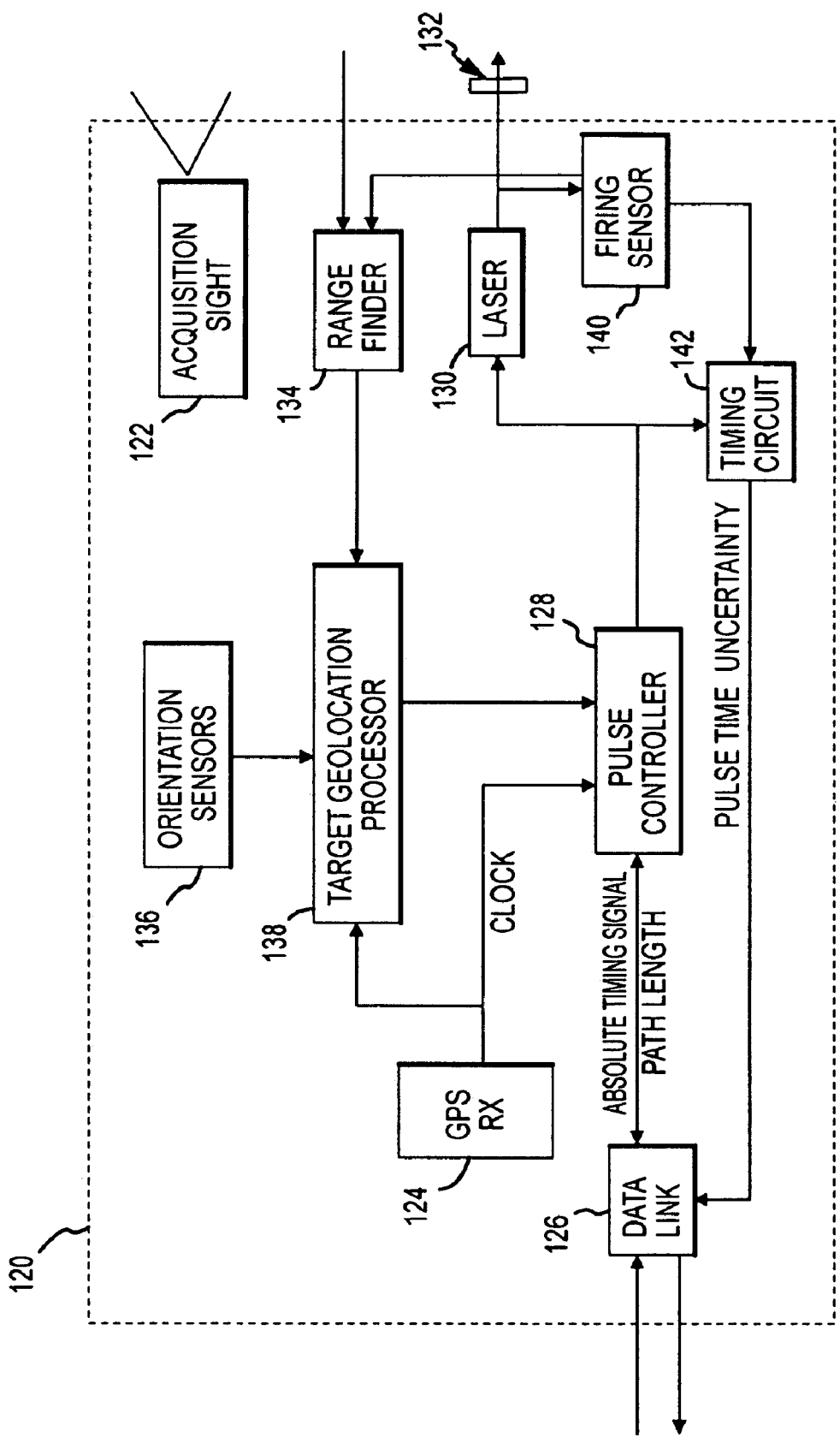
FIG. 4 is a simplified block diagram of an embodiment of a SAL designator.

The present invention describes an innovative approach to SAL designation that uses absolute time coding of the pulse-stream to disambiguate the designator in a manner that reduces the number of pulses in a pulse-stream and reduces the total pulse energy on the target. This requires timing synchronization between the designator and receiver. For improved rejection of unintended returns, more precise time gating (a narrower absolute time window) is used. This can be achieved by removing the path length and/or firing time uncertainties. Absolute time coding reduces the number of pulses and total energy on target in two ways. First, the designator may only have to transmit the pulse-code once. The "spot" appears for the brief time associated with a pulse-stream and disappears; continuous lasing of the target is not required. Second, the designator can be disambiguated using a combination of pulse-code (relative spacing of pulses) and pulse-position (absolute timing of pulses) modulation. This allows the pulse-stream to be shortened considerably, perhaps to a single pulse.

Without loss of generality, absolute time encoded SAL designation will be described in the context of a precision-guided weapon system in which the designator is a man-portable system and the "receiver" is mounted on a missile that includes an autonomous guidance system for terminal guidance once target designation is acquired. As used herein "SAL receiver" refers to any receiver configuration used to detect returns from the target. Conventional SAL receivers also include processing capability to extract guidance information from the pulse-stream. Weapons that use absolute time encoded SAL designation may require a separate autonomous guidance capability. The described scenario is merely illustrative of the use of absolute time encoded SAL designation. In general, the designator can be controlled by a human operator or automated and may be mounted on any platform, which may be terrestrial, air, sea or space based. The receiver may be mounted on any platform, which may be terrestrial, air, sea or space based. The receiver platform may be a weapon such as a missile but is not so limited (e.g. other operators, sense systems, fire control systems etc). If guidance to the target post-acquisition is required, the platform may provide autonomous guidance capability. The target may be terrestrial, air, sea or space based. Target is used generally to mean any object that is designated. The designator may lase a single target for a single receiver or it may lase multiple targets for multiple receivers.

As shown in FIG. 1, an observer 10 identifies a target 11 using the sight on his laser designator 12. The target geo-location is derived using, for example, a GPS receiver on the designator to determine the observer's location and a range finder on the designator to determine the range and orientation of the target. Other methods can be used to determine the target's geo-location. The observer calls in an air strike via a data link 14 to a command center 16. The command center issues a command via data link 18 to a helicopter 20 to release a missile 22 directed towards the specified geo-location of the target. Prior to SAL designation of the target, the missile may use GPS, inertial, terrain navigation or some combination thereof to guide itself toward the specified target geo-location.

SAL designation communicates synchronization signals 24 including an absolute timing signal between missile receiver 26 and designator 12 indicating the arrival time of a reflected pulse-stream at the receiver. The receiver's and designator's internal clocks are synchronized (with quantifiable error) to an absolute time base by, for example, using the clock signals provided by the network of GPS satellites 28. Communication of the absolute timing signal in whole or in part can be performed in many different ways. The missile receiver may send the absolute timing signal to the designator over a data link 30 indicating when to transmit the pulse-stream or when the absolute time window is open (returns gated) at the receiver. Alternately, the designator may send the absolute timing signal to the receiver over data link 30 indicating when the designator will or does transmit the pulse-stream, when the pulse-stream will reach the target or when the reflected pulse-stream will arrive at the receiver. The receiver and designator may exchange absolute timing signals or the required portions thereof. A 3$^{rd}$ party such as the command center or helicopter may send the absolute timing signal to the designator and the receiver over a different data link.

Operator 10 aims the designator to visualize the target, possibly pulls a trigger to "enable" the designator and, at the specified GPS-coordinated time, the designator automatically fires a pulse-stream 34 including at least one pulse 36 to place a laser "spot" 32 on target 11. The returns 38 from the target within the field-of-view (FOV) 40 of receiver 26 are gated within an absolute time window 44. The absolute timing signal is used to synchronize the timing between the transmission of the laser pulse-stream 34 and the gating of the returns 38 to place the reflected pulse-stream 42 in the absolute time window 44 (gate) at the receiver. The returns in the absolute time window are processed to extract the reflected pulse-stream 42 to designate the target 11 and verify the designator 12 as the source of the reflected pulse-stream 42. The missile's receiver 26 uses detected pulse-stream 42 to handover the target position in its FOV 40 to its autonomous guidance system to guide the missile to impact.

Absolute time coding reduces the number of pulses and total energy on target in two ways. First, the designator may only have to transmit the pulse-code once. The "spot" appears for the brief time associated with a pulse-stream and disappears; continuous lasing of the target is not required. The system may be configured for the receiver to send a verification signal of successful designation, to send another absolute timing signal if designation is not received in the open gate, to transmit another pulse-stream with a timing signal if verification not received etc. Second, the designator can be disambiguated using a combination of pulse-code (relative spacing of pulses) and pulse-position (absolute timing of pulses) modulation. This allows the pulse-stream to be shortened considerably, perhaps to a single pulse. But for the pulse-position modulation to place the pulse-stream in the absolute time window, the shortened codes would be insufficient to reduce the ambiguity of designator verification to less than a specified threshold. Full-length codes capable of disambiguating the designator (e.g. based on the known frequency) may be used with absolute time coding to eliminate repetition. The use of non-repeating pulse-streams and particularly non-repeating shortened pulse-streams is however insufficient to generate guidance commands to guide a weapon to the target. For these pulse-stream configurations SAL designation is used solely to designate a target. SAL designation may be used to redesignate the target. If absolute time encoding is used to reduce the number of pulses that are transmitted in a repeating pulse stream to impact, each input to the guidance system may be extracted from the fewer available pulses.

As shown in FIGS. 2a through 2c, the pulse-stream may include a single pulse 50 placed in absolute time window 52, a sequence of single pulses 54 transmitted at arbitrary times and each separately gated at the receiver and placed in absolute time windows 56 or multiple pulses 58 placed in a single absolute time window 60. The number and relative spacing of pulses in the pulse stream (pulse-code modulation) and placement of the entire pulse-stream in a time window or individual pulses in separate time windows (pulse-position modulation) reduces the ambiguity of designator verification to less than a specified threshold. A single pulse, no pulse-code modulation, places the tightest tolerance on the time window to disambiguate the designator.

If the absolute timing signal and absolute time window are sufficiently accurate, the single pulse 50 will be sufficient to disambiguate the designator as the source of the pulse. Transmission of a single pulse greatly reduces the number of pulses and energy on target. This also greatly expands the technology and design space for the laser designator by reducing the power and repetition rate requirements. Lighter weight, smaller and less expensive single-shot designators may be deployed. Furthermore, single pulse pulse-streams could greatly simplify the receiver electronics.

The sequence of individually-gated single pulses 54 may be treated as one pulse-stream with the spacing between the pulses known to both the designator and receiver or as unique pulse-streams transmitted at arbitrary firing times and each accompanied by an absolute timing signal. These pulses may be spaced far enough apart that it is impractical for a receiver at the target to correlate the pulse-stream without a priori information as to the pulse-stream. But with knowledge of pulse spacing and updates to the synchronization signals coherent tracking can be maintained at the receiver on the weapon. When considered as unique pulse-streams, the individual pulses are being "repeated". However, the pulse-stream is very short, one pulse, and the repetition interval is large so that the total number of pulses and energy remains small.

The multiple pulses 58 captured with a single gate have a known relative spacing. This case is the most similar to conventional SAL designation in which a sequence of pulses at a known frequency is time-correlated against the returns as soon as the missile is within acquisition range to detect a reflected pulse-stream. However, because no absolute timing information is available to gate the returns, the time correlation must be long enough to disambiguate the designator and the designator must continuously transmit the pulse-stream to ensure designation. Under the same battlefield conditions a pulse-stream using SAL designation with absolute time encoding can be much shorter than a conventional SAL designation pulse-stream. The system advantages for designing the designator and receiver and the battlefield advantages of short pulse-streams are considerable.

As shown in FIG. 3, synchronization of the designator and receiver to place the reflected pulse-stream in the absolute time window has two parts. The first part is the absolute timing signal that indicates the arrival time of the reflected pulse. The second part is the timing errors that are accounted for in the width of the absolute time window. Together these two pieces of information ensure that the reflected pulse-stream is placed in the absolute time window at the receiver. Depending on the system configuration the absolute timing signal and timing errors may be generated and communicated as separate pieces of information e.g. the designator sends the firing-time and the path length or as an integrated piece of information e.g. the receiver specifies an absolute time window the gate is open or the designator specifies an absolute time window in which the pulse stream will arrive. The information can be parsed, communicated and used to synchronize pulse placement in many different ways to the same end of placing the pulse-stream in the absolute time window at the receiver.

As shown, at some time after the missile is in range (t=0) to acquire a designation pulse-stream, the designator transmits a single-pulse 100 at time $t_{fire}$ to place the reflected pulse 102 at $t_{arrival}$, within absolute time window 104. At a minimum the window 104 should account for the width of the pulse-stream and any clock synchronization errors between the designator and receiver. For example, the designator and receiver may sync their clocks to a GPS or other satellite system, which will have some amount of error. Other possible timing errors include the path length delay for the pulse-stream from the designator to the target and back to the receiver. Without correction, the window 104 must accommodate the minimum and maximum path length delay. Without correction, the timing error between the intended and actual firing of the pulse-stream should also be accommodated.

To further reduce designator ambiguity, either or both of the path length delay and the firing error can be corrected. Correction has the effect of both narrowing the absolute time window 106 and shifting the placement of the window. For path length correction, the system may assume that the error will be removed and set the absolute time window accordingly a priori. Alternately, the system may set a default time window 104 large enough to account for path length errors should the correction not be available. For firing time correction, the system will store the returns within the absolute time window, possibly narrowed for path length correction, and upon receipt of the firing time correction narrow and shift the windowing of the stored data that is then processed.

As shown removal of both path length and firing error narrows absolute time window 106 to approximately the width of the single pulse 102 with allowance for clock synchronization errors. The absolute timing signal $t_{fire}$ is shifted by both $\Delta t_1 = t_{path\ length}$ and $\Delta t_2 = \Delta t_{fire}$ to specify $t_{arrival}$ where $t_{path\ length}$ is the time a pulse travelling at the speed of light takes to travel from the designator to the target and back to the receiver and $\Delta t_{fire}$ is the difference in the stated and measured firing times of the laser. Narrowing and shifting the time window to remove path length and firing time error provides very precise absolute time encoding, which in turn can disambiguate the designator with as little as a single pulse.

In order to satisfy the synchronization requirements to place the pulse-stream in the absolute time window, in the preferred embodiment firing of the pulse-stream is controlled automatically by the designator and synchronized to the clock signal. The operator may pull the trigger to enable the designator to transmit the pulse-stream but firing is taken out of the hands of the operator to ensure precise synchronization. In another embodiment, the designator could signal the operator precisely when to pull the trigger to fire the pulse-stream. However, to compensate for timing uncertainty of the operator triggering the pulse-stream, either the pulse-stream would be repeated for some time period around the specified firing time (albeit much shorter than conventional SAL with no time coding) or the absolute time window at the receiver would have to be widened to account for the additional firing time uncertainty associated with the operator. Repeating the pulse-stream produces more pulses and energy on target whereas increasing the absolute time window increases designator ambiguity.

The relevant sub-systems of an embodiment of a designator 120 are shown in FIG. 4. These sub-systems may be combined or separated in different configurations and still perform the required functionality. An acquisition sight 122 allows an operator to visualize and place a laser spot on a target. A GPS receiver 124, data link 126, pulse controller 128 and laser 130 provide the base designator functionality to transmit a pulse-stream according to the absolute timing signal to place the reflected pulse stream in an absolute time window at the receiver on the missile. GPS receiver 124 provides a clock signal that is synchronized with a clock signal on the missile. Data link 126 provides the capability to send or receive the absolute timing signal (or the portion required at the designator). For example, the designator may receive the absolute time window that the gate is open at the receiver or may transmit an absolute time window in which the pulse-stream will arrive at the missile. Pulse controller 128 receives the clock signal, receives or transmits the absolute timing signal and controls laser 130 to generate a pulse-stream 132 at a specified firing time. Firing of the pulse-stream is automatic and synchronized to the clock signal.

To correct for path length, designator 120 also includes a range finder 134, orientation sensors 136 and a target geolocation processor 138. GPS receiver 124 provides the geolocation of the designator. The weapon's GPS receiver provides the geolocation of the weapon, which is forwarded via data link 126. Range finder 134 provides the range to the target. This may be done using the same pulse-stream 132 that designates the target or a different signal. Orientation sensors 136 provide the orientation of the designator. Target geolocation processor 136 combines the geolocation of the designator with the orientation and range to target to calculate the target geolocation. In an alternate configuration, the range finder and orientation sensor may be omitted and target geolocation provided by other sources and sent to the designator. Given the geolocation of the designator, target and missile, pulse controller 128 computes the path length. Note, in other configurations the designator determines the path length from the designator to the target and communicates the path length to the weapon, which in turn determines the entire path length and makes the timing corrections.

Pulse controller 128 can then correct for the measured path length in any number of ways. The pulse controller can shift the firing of pulse-stream 132 to compensate for the path length so that the pulse-stream arrives in the open window specified by the missile receiver or arrives at the time specified by the designator. At the missile receiver, the absolute time window may be set a priori on the assumption path length will be removed or may be narrowed upon receiving a signal from the designator that path length has been removed. Alternately, the pulse controller may transmit the path length via data link 126 to the missile and allow its receiver to shift the arrival time and narrow the gating accordingly. In this latter case, the designator may only compute a portion of the path length, that being the range-to-target, which the missile cannot compute, and forward that to the missile relying on the missile to provide its geolocation and that of the target.

To correct for firing time uncertainty, a firing sensor 140 measures the actual firing time of the pulse-stream. A timing circuit 142 compares the actual firing time to the "firing time" to produce a pulse time uncertainty that is communicated via data link 126 to the missile receiver. The pulse time uncertainty correction occurs after the pulse-stream has been fired and gated at the missile receiver. The missile receiver stores the returns inside the absolute time window, possibly compensated for path length, in a buffer. The missile receiver uses the pulse time uncertainty to narrow and shift the window to extract the return data from the buffer for processing.

Figure 5:
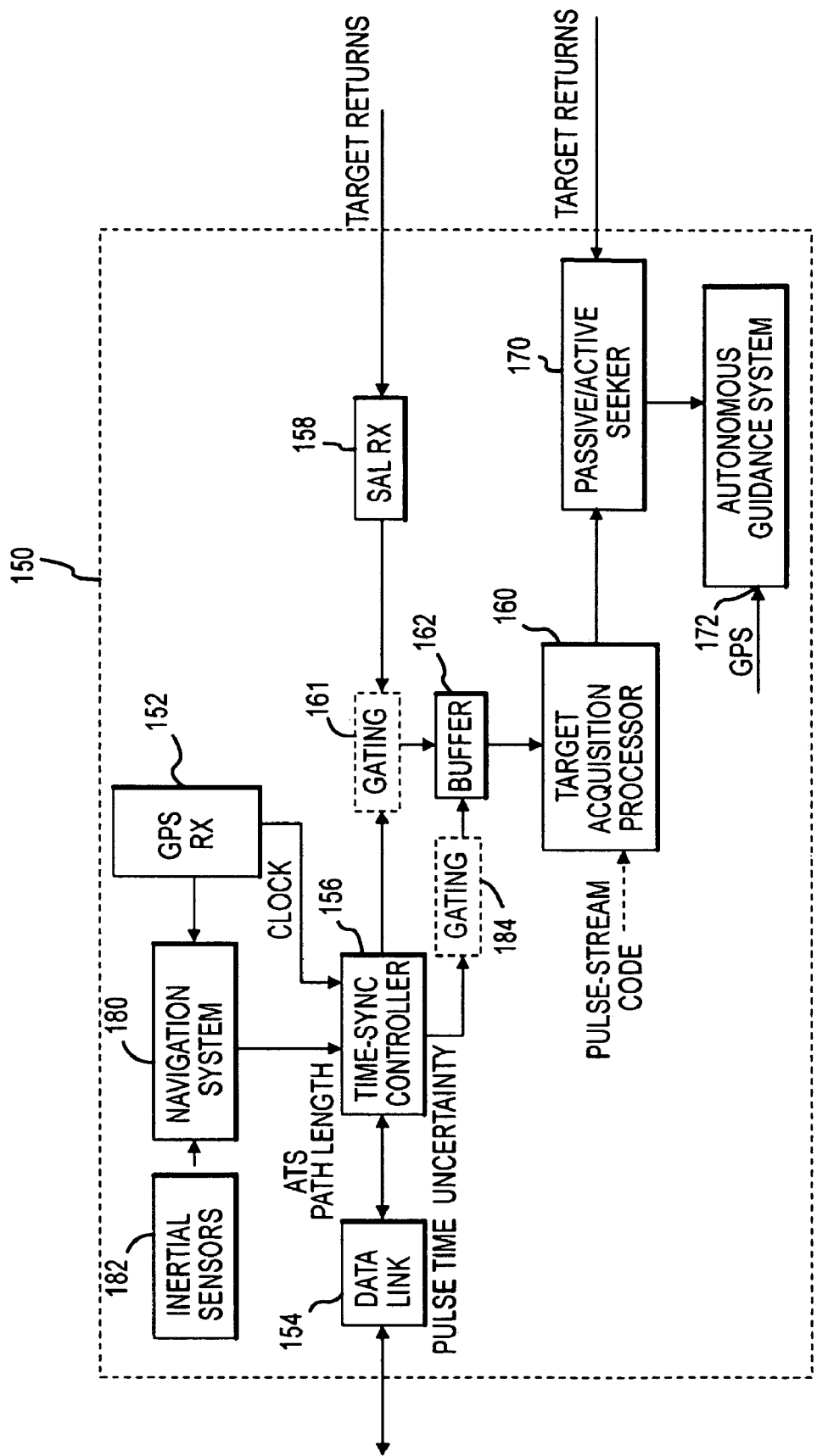
FIG. 5 is a simplified block diagram of an embodiment of a weapon including a SAL receiver and autonomous guidance.

The relevant sub-systems of an embodiment of the designation and guidance portion of a "receiver" 150 for a precision-guided weapon system are shown in FIG. 5. These sub-systems may be combined or separated in different configurations and still perform the required functionality. A GPS receiver 152, data link 154, time-sync controller 156, SAL receiver 158 and target acquisition processor 160 provide the base receiver functionality to gate the returns from the target according to the absolute timing signal to place the reflected pulse stream in the absolute time window. GPS receiver 152 provides a clock signal that is synchronized with a clock signal at the designator. Data link 154 provides the capability to send or receive the absolute timing signal (or the portion required at the receiver). SAL receiver 158 detects the return in its FOV. Time-sync controller 156 receives the clock signal, receives or transmits the absolute timing signal and gates 161 the returns in the absolute time window to store the data in a buffer 162. Target acquisition processor 160 processes the windowed data against the expected pulse-stream code (single pulse, sequence of individual pulses, sequence of multiple pulses) to designate the target and verify the designator as the source of the pulse-stream.

In this embodiment, the guidance commands required to guide the missile to impact the target are not supported by the pulse-stream code. The pulse-stream is not continuously repeated and the pulse-stream is too short and/or the pulses are not spaced closely enough to support the bandwidth requirements for guidance control. Consequently the receiver hands over the target position in its FOV to a passive or active imaging seeker 170 with sufficient bandwidth to support an autonomous guidance system 172 to guide the missile to impact. Instead of the seeker, GPS updates of target position could be supplied to the guidance system. In an alternate embodiment, if the absolute time encoding is used to time-sync pulses that are repeated through acquisition to impact it may be possible to compute each input to the guidance system from fewer pulses.

To correct for path length, a navigation system 180 receives position information from, for example, a GPS receiver 152 and/or inertial sensors 182 to provide the geolocation of the missile. In the configuration described for the designator, time-sync controller 156 communicates the missile geolocation via data link 154 to the designator. Alternately, the receiver may receive the range to target and possibly target geolocation from the designator and perform the timing corrections in the time-sync controller. The time-sync controller adjusts gating 161 to narrow the absolute time window to remove path length uncertainty and to shift the arrival time. To correct for pulse time uncertainly, the time-sync controller adjusts gating 184 to further narrow the absolute time window and to shift the arrival time by the 'pulse time uncertainty' and discard any data in the buffer outside the updated window.

Because the absolute time encoded SAL designation supports transmitting short pulse-streams e.g. a single-pulse that do not have to be repeated, it is well suited for incorporation into a system that controls a single designator to designate multiple different targets for multiple different weapons in rapid succession. This is not envisioned as a "man-in-the-loop" system. A targeting system using a passive or active imaging seeker would acquire and discriminate a plurality of targets in a FOV and provide angle information for each target. A controller controls a beam pointing system (BPS) to slew a SAL designator and transmits a pulse-stream towards each of the discriminated targets in a time sequence. The BPS lases the targets in sequence so that any target within the angle uncertainty of the laser is not within the timing uncertainty. The reflected pulse-streams are received at a respective plurality of receivers on different weapon platforms, which are instructed when and where to look for the pulse-stream. The timing between the designator's transmission of each pulse-stream and each receiver's gating of the returns off the different targets is synchronized to place each reflected pulse-stream in an absolute time window at the respective receiver.

This approach may be used to exploit an inventory of SAL designation weapons that have autonomous guidance capability but lack designation capability or where active or passive designation on-board the weapon is not feasible. For example, in a dense ground battlefield scenario a sophisticated forward targeting system may be able to efficiently designate multiple targets and coordinate multiple weapons to attack those targets. In a space-based system, a carrier vehicle (CV) may deploy multiple kill-vehicles (KVs) to address a target cloud. The carrier vehicle provides the platform for a central targeting system, BPS and powerful laser to designate a different target for each KV. Once acquired, the KV's imaging sensor can support guidance to terminal intercept.

Figure 6:
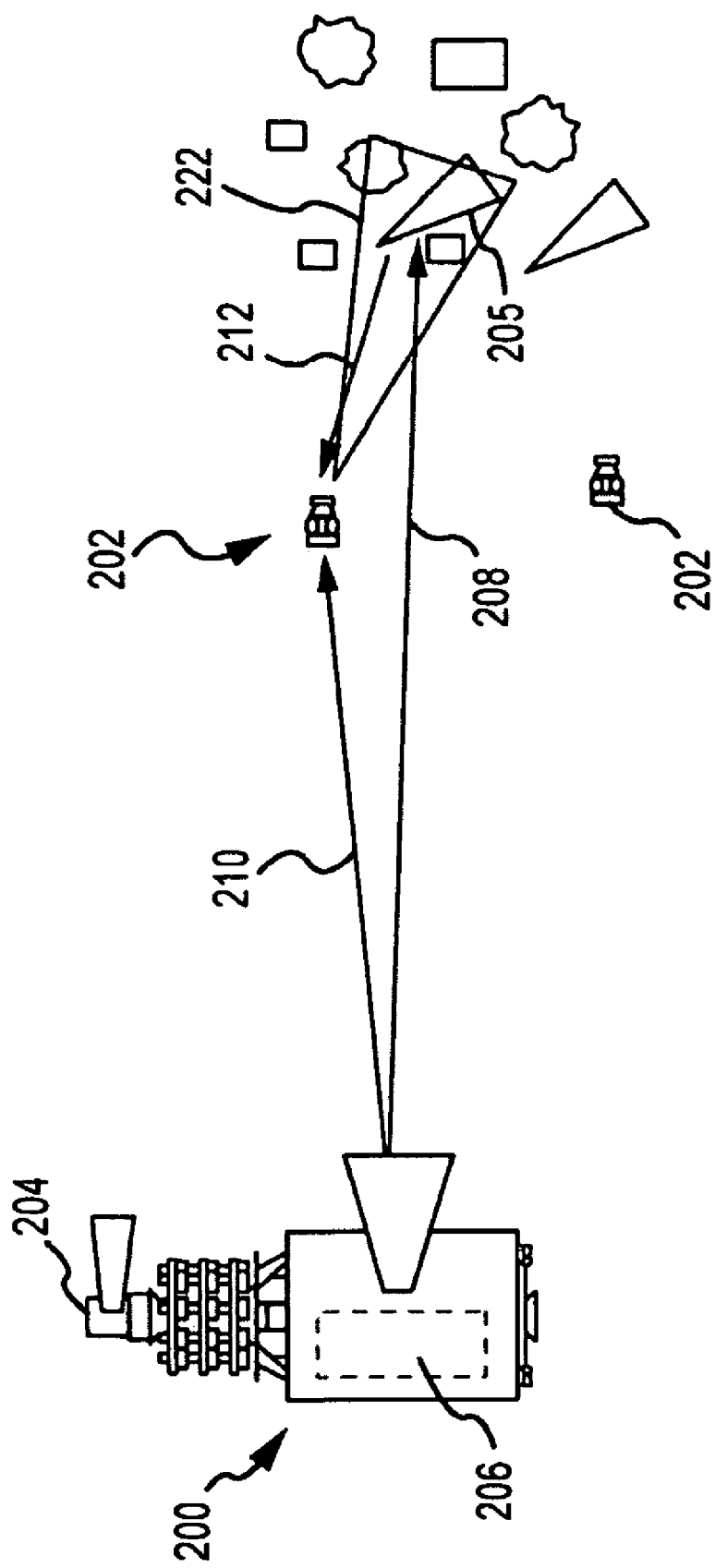
FIG. 6 is a diagram of a multiple kill vehicle (MKV) space-based system for designating a plurality of targets to multiple KVs using absolute time encoded pulse streams.

A multiple KV space-based interceptor system using absolute time encoding of SAL designation is illustrated in FIGS. 6 and 7a-7b. The presence of an incoming target is detected and signaled to the battlefield management system by an early warning system and an MKV interceptor is launched on a path to intercept the target. At a certain range to the target cloud, the interceptor's carrier vehicle 200 releases the KVs 202 and preferably deploys them in waves out in front of the CV. An exemplary CV includes a discrimination and acquisition sensor subsystem 204 for passively acquiring and discriminating real targets 205 based on external cues and control sensor subsystem 206 for actively tracking multiple targets. The control sensor subsystem includes a highly agile and very accurate beam pointing system (BPS) that moves a laser's FOV over a field of regard (FOR), an angle/angle/range (AAR) short-band IR receiver and a controller.

The CV suitably hands over the target designation and tracking information to each KV by illuminating each target with a laser pulse-stream 208 in a time sequence. Data 210 is uplinked in advance to each KV to tell its imaging sensor when (absolute time window) and where to look for the returns 212 of its target. The KV sees the return signature off the designated target to acquire the target and initiate post-handover tracking. Each KV uses its imaging sensor subsystem to maintain track on the aimpoint to terminal intercept.

As shown in FIG. 7a, the laser transmits a pulse 214 at a designated target and a particular KV will look for the reflected pulse 215 from its designated target within an "absolute time window" 216 to detect the return signal. The laser transmits another pulse 218 at a different target and a different KV will look for its reflected pulse 219 from the target within absolute time window 220. To reduce the likelihood of mis-designation, the controller controls the BPS to illuminate the targets in a QWERTY scan order reminiscent of the typewriter keyboard layout. As shown in FIG. 7b, a QWERTY scan designates the targets in order 1, 2, 3, 4, 5, . . . so that any target within the angle uncertainty of the KV's imaging sensor's FOV 222 is not within the timing uncertainty of the designation. As with the typewriter, this temporally separates actions that are spatially nearby.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

I claim:

1. A method for semi-active laser (SAL) designation of a target, comprising:

providing synchronized clock signals to a receiver on a first platform and a designator on a second remote platform;

communicating an absolute timing signal between the receiver and the designator indicating the arrival time of a reflected pulse-stream at the receiver;

transmitting a pulse-stream including at least one pulse from the designator towards the target;

gating the returns from the target at the receiver within an absolute time window;

using the absolute timing signal to synchronize the timing between the transmission of the laser pulse-stream and the gating of the returns to place the reflected pulse-stream in the absolute time window at the receiver; and processing the returns in the absolute time window to extract the pulse-stream to designate the target and verify the designator as the source of the pulse-stream.

2. The method of claim 1, wherein said laser pulse-stream includes only one pulse.

3. The method of claim 1, wherein placement of the reflected pulse stream in the absolute time window reduces the ambiguity of designator verification to less than a specified threshold, the number and relative spacing of pulses in the pulse stream being insufficient to reduce the ambiguity to less than the specified threshold but for the placement of the pulse-stream in the absolute time window.

4. The method of claim 1, wherein the number and relative spacing of pulses in the pulse stream and placement of the pulse-stream in the time window reduces the ambiguity of designator verification to less than a specified threshold.

5. The method of claim 1, wherein the relative spacing of pulses in the pulse stream is known to both the designator and receiver.

6. The method of claim 1, wherein the pulse stream includes a plurality of pulses with a relative spacing known to both the designator and receiver, said receiver gating the returns to place each individual pulse in its own absolute time window.

7. The method of claim 6, wherein a path length from the designator to the target and back to the receiver is measured to shift the placement of the absolute time window for each said pulse.

8. The method of claim 1, wherein the absolute time window accounts for the removal of path length error, further comprising:
estimating the path length from the designator to the target and back to the receiver; and
augmenting the absolute timing signal to shift the placement of the absolute time window for the estimated path length.

9. The method of claim 8, further comprising setting the absolute time window a priori to account for the removal of path length error.

10. The method of claim 8, further comprising:
setting the absolute time window to allow for path length error; and
if the estimate of the path length is available, narrowing the absolute time window to remove path length error and shifting the placement of the narrowed absolute time window.

11. The method of claim 8, wherein the path length is estimated by geolocating said designator and said target and estimating the path length from the designator to the target.

12. The method of claim 11, wherein the same pulse-stream that is reflected off the target to the receiver is used to geolocate the target.

13. The method of claim 11, wherein the same pulse-stream that is reflected off the target to the receiver is used to estimate the path length from the designator to the target.

14. The method of claim 1, further comprising:
measuring the absolute transmission time of the pulse-stream;
relaying the absolute transmission time to the receiver;
narrowing the absolute time window to remove transmission time error; and
augmenting the absolute timing signal to shift the placement of the absolute time window to account for the absolute transmission time.

15. The method of claim 1, wherein the absolute timing signal is communicated between the designator and receiver by (a) the receiver sending the absolute timing signal to the designator indicating when to transmit the pulse-stream or when the absolute time window is open at the receiver, (b) the designator sending the absolute timing signal to the receiver indicating when the designator will transmit the pulse-stream, when the pulse-stream will reach the target or when the reflected pulse-stream will arrive at the receiver, or (c) a third remote platform sending the absolute timing signal to the designator and the receiver.

16. The method of claim 1, wherein the first platform also includes an autonomous guidance system for guiding the platform to the designated target.

17. The method of claim 1, wherein the pulse-stream is transmitted once.

18. The method of claim 17, wherein the receiver sends a verification signal back to the designator.

19. The method of claim 18, wherein if the verification signal is negative the pulse-stream is transmitted again in accordance with another absolute timing signal.

20. The method of claim 1, wherein the synchronized clock signals are provided by GPS.

21. The method of claim 1, further comprising:
slewing the second platform to point the designator and transmit a pulse-stream towards each of a plurality of targets in a time sequence;
receiving the reflected pulse-streams at a respective plurality of said receivers on different first platforms;
synchronizing the timing between the designator's transmission of each said pulse-stream and each said receiver's gating of the returns off the different targets to place each said reflected pulse-stream in an absolute time window at the respective receiver.

22. The method of claim 21, further comprising:
maneuvering each said first platform to orient the receiver to look for its target in a designated direction at the designated time.

23. A method for semi-active laser (SAL) designation of a target, comprising:
providing synchronized clock signals to a receiver on a first platform and a designator on a second remote platform;
communicating an absolute timing signal between the receiver and the designator indicating the arrival time of a reflected pulse-stream at the receiver in an absolute time window that accounts for the removal of path length uncertainty;
estimating the path length from the designator to the target and back to the receiver;
automatically transmitting a pulse-stream once from the designator towards the target, said pulse-stream including at least one pulse;
gating the returns from the target at the receiver within the absolute time window;
using the absolute timing signal and the path length to synchronize the timing between the transmission of the laser pulse-stream and the gating of the returns to place the reflected pulse-stream in the absolute time window at the receiver; and
processing the returns in the absolute time window to extract the pulse-stream to designate the target and verify the designator as the source of the pulse-stream to less than a specified threshold, the number and relative spacing of pulses in the pulse stream being insufficient to reduce the ambiguity to less than the specified threshold but for the placement of the pulse-stream in the absolute time window.

24. The method of claim 23, wherein said laser pulse-stream includes only one pulse.

25. The method of claim 23, further comprising:
setting the absolute time window to allow for path length error; and
if the estimate of the path length is available, narrowing the absolute time window to remove path length error and shifting the placement of the narrowed absolute time window.

26. The method of claim 23, further comprising:
sending a verification signal from the receiver to the designator; and
if the verification signal is negative, retransmitting the pulse-stream in accordance with another absolute timing signal.

27. A system for semi-active laser (SAL) designation of a target, comprising:
a designator on a remote first platform configured to visualize a target and transmit a pulse-stream including at least one pulse towards the target;
a receiver on a second platform configured to gate the returns from the target within an absolute time window and process the returns to designate the target and verify the designator as the source of the pulse-stream;
means for providing synchronized clock signals at the designator and receiver; and
means for communicating an absolute timing signal between the receiver and the designator to place the reflected pulse-stream return in the absolute time window at the receiver.

28. The system of claim 27, wherein the designator is a single-shot laser capable of firing only a single pulse.

29. The system of claim 27, wherein the absolute time window accounts for the removal of path length error, further comprising means for estimating the path length from the designator to the target and back to the receiver, said receiver augmenting the absolute timing signal to shift the placement of the absolute time window for the estimated path length.

30. The system of claim 27, further comprising means for measuring the absolute transmission time of the pulse-stream and relaying the time to the receiver, said receiver narrowing the absolute time window to remove transmission time error and augmenting the absolute timing signal to shift the placement of the absolute time window to account for the absolute transmission time.

31. The system of claim 27, where said means for providing synchronized clocking signals comprises a GPS satellite network.

32. The system of claim 27, further comprising means for slewing the designator to transmit a pulse stream towards each of a plurality of targets in a time sequence for a respective plurality of receivers.

33. A precision guided weapons system for semi-active laser (SAL) designation of a target, comprising:
a remote designator platform including a designator configured to visualize a target and transmit a pulse-stream including at least one pulse at the target;
a weapon system platform including,
a receiver configured to gate the returns from the target within an absolute time window and process the returns to designate the target and verify the designator as the source of the pulse-stream, and
an autonomous guidance system for guiding the weapons system platform to the designated target;
means for providing synchronized clock signals at the designator and receiver; and
means for communicating an absolute timing signal between the receiver and the designator to place the reflected pulse-stream return in the absolute time window at the receiver.

* * * * *